United States Patent
Crooijmans et al.

(10) Patent No.: US 8,749,962 B2
(45) Date of Patent: Jun. 10, 2014

(54) KEYPAD ASSEMBLY WITH A CONTOURED KEYPAD FACADE FOR A MOBILE COMPUTING DEVICE

(75) Inventors: Wilhelmus Crooijmans, San Jose, CA (US); Yoshimichi Matsuoka, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 173 days.

(21) Appl. No.: 13/171,045

(22) Filed: Jun. 28, 2011

(65) Prior Publication Data

US 2012/0200994 A1 Aug. 9, 2012

Related U.S. Application Data

(60) Provisional application No. 61/440,353, filed on Feb. 7, 2011.

(51) Int. Cl.
| | | |
|---|---|---|
| H04M 1/00 | (2006.01) | |
| G06F 1/16 | (2006.01) | |
| H05K 5/00 | (2006.01) | |
| H05K 7/00 | (2006.01) | |
| B41J 3/54 | (2006.01) | |
| B41J 5/00 | (2006.01) | |

(52) U.S. Cl.
USPC ............ 361/679.09; 455/575.1; 455/575.3; 455/575.4; 361/679.08; 361/679.11; 361/679.14; 361/679.15; 400/82; 400/472; 400/473; 400/474; 400/476; 400/480; 400/481; 400/485; 400/486; 400/487; 400/488; 400/489; 400/490; 400/491; 400/491.1; 400/491.2; 400/491.3; 400/492; 400/493; 400/493.1; 400/493.2; 400/494; 400/495; 400/495.1; 400/496

(58) Field of Classification Search
USPC ............ 455/575.4, 575.1, 575.3; 361/679.09, 361/679.08, 679.11, 679.14, 679.15; 400/82, 472–496
See application file for complete search history.

(56) References Cited

U.S. PATENT DOCUMENTS

| | | | |
|---|---|---|---|
| 7,877,123 B2 * | 1/2011 | Abdul-Gaffoor et al. . | 455/575.4 |
| 2006/0097035 A1 * | 5/2006 | Castaneda et al. ........ | 235/145 R |
| 2008/0032637 A1 * | 2/2008 | Ladouceur et al. ......... | 455/90.3 |
| 2009/0027841 A1 * | 1/2009 | Shih et al. .................... | 361/680 |
| 2009/0059495 A1 * | 3/2009 | Matsuoka ..................... | 361/681 |
| 2009/0173610 A1 * | 7/2009 | Bronstein et al. ............. | 200/314 |
| 2009/0174666 A1 * | 7/2009 | Matsuoka ..................... | 345/169 |

* cited by examiner

*Primary Examiner* — Anthony Haughton
*Assistant Examiner* — Zhengfu Feng
(74) *Attorney, Agent, or Firm* — Mahamedi Paradice, LLP (57) ABSTRACT

A mobile computing device is disclosed. The mobile computing device comprises a housing that includes a section to retain a keypad assembly. The keypad assembly includes at least a keypad façade that carries a plurality of keys. The keypad façade of the keypad assembly is contoured to adjoin and be substantially flush with the section of the housing.

18 Claims, 7 Drawing Sheets

KEYPAD ASSEMBLY WITH A CONTOURED KEYPAD FACADE FOR A MOBILE COMPUTING DEVICE

RELATED APPLICATIONS

This application claims the benefit of priority under 35 U.S.C. 119(e) to Provisional Application Ser. No. 61/440,353, filed Feb. 7, 2011, titled KEYPAD ASSEMBLY WITH A CONTOURED KEYPAD FACADE FOR A MOBILE COMPUTING DEVICE, which is incorporated herein by reference in its entirety.

BACKGROUND OF THE INVENTION

Over the past few years, the use of mobile computing devices, such as cell phones, has increased dramatically. This has led to an increase in the variety of different types and shapes of cell phones. As the demand for smaller sized cell phones have increased, the need for keypads and keys that are small and tightly spaced have also increased. More specifically, keypad assemblies that provide a full set of keys, such as a QWERTY keyboard layout, are needed.

At the same time, in addition to device sizes, form factor considerations, such as sleekness and appearance, are important to marketing a device.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Embodiments described herein provide a keypad assembly for a computing device. The keypad assembly includes a keypad façade on which keys (or key structures) are integrally formed. The keypad façade is contoured to include a peripheral lip that at least partially circumvents the keypad façade. The shape of the façade facilitates integrating the keypad assembly into a computing device.

In particular, some embodiments provide for the keypad assembly to be assembled and retained in the housing of a mobile computing device. The contoured keypad façade may be shaped and dimensioned to abut the surrounding housing portions in a manner that is substantially flush and/or seamless.

Still further, embodiments described herein include a mobile computing device that includes a keypad assembly that is retained in a section of the housing of the mobile computing device. The keypad assembly includes a keypad façade that carries a plurality of keys to enable a user to access the mobile computing device. The keypad façade of the keypad assembly is also contoured to adjoin and be substantially flush with the section of the housing.

According to some embodiments, the keypad assembly also includes an adhesive layer that is positioned underneath the keypad façade. In some embodiments, the keypad assembly further includes an illumination layer to provide light to a plurality of characters on the plurality of keys. The illumination layer can be positioned underneath the keypad façade. The keypad assembly may also include an electrical contact layer.

Still further, according to some embodiments, the keypad façade includes a plurality of keys that provide a QWERTY type keyboard. The plurality of keys can also provide a number pad. The number of keys that are included in the keypad façade, as well as the design and shape of the individual keys, can vary depending on one or more embodiments.

In one embodiment, the keypad façade is shaped and contoured so that it includes a lip that at least partially circumvents the plurality of keys. The lip may include a surface that is oriented towards the plurality of keys. In this way, the keypad façade may have a flat portion near the keys and a curved portion near the edges or boundary of the keypad façade. The lip enables the keypad façade to adjoin and be substantially flush with the housing of the mobile computing device.

According to other embodiments, the mobile computing device may include two housing segments. A first housing segment and a second housing segment can be slideably coupled to each other so that the housing segments can move between an extended and contracted position. The second housing segment can include a section to retain a keypad assembly. The keypad assembly includes a keypad façade that carries a plurality of keys and that is contoured to adjoin and be substantially flush with the section of the second housing segment.

In other embodiments, the second housing segment can be overlapped by the first housing segment so that the keypad assembly is not visible when the housing segments are in a contracted position. The keypad assembly is partially visible or fully visible when the housing segments are slideably moved to move from the contracted position to the extended position. The first housing segment may also include a display assembly that is visible regardless of the position of the two housing segments.

As used herein, the term "substantially" means at least 90% of a stated reference, value or point of comparison. In the context of "substantially flush", two thicknesses may be assumed to be about the same height, so as to be within 90% of one another, or alternatively within the manufacturing tolerances for producing the respective thicknesses.

Overview

Figure 1A:
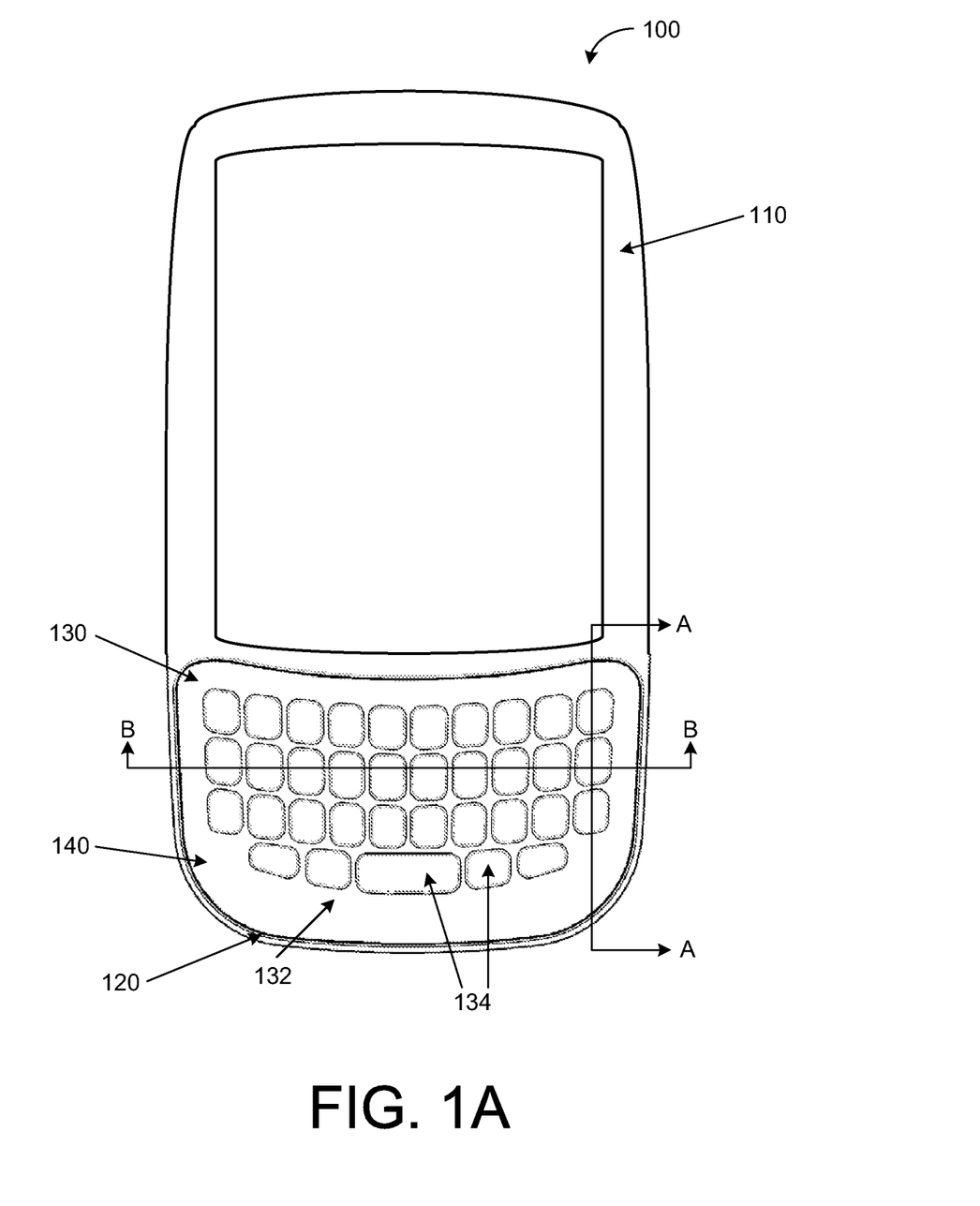
FIG. 1A illustrates a mobile computing device, configured in accordance with one or more embodiments of the invention.

FIG. 1A illustrates a mobile computing device that includes a keypad assembly, under an embodiment. The mobile computing device includes a section of the housing that is configured to retain a keypad assembly. The keypad assembly has a keypad façade that is shaped and contoured to adjoin and be substantially flush with the section of the housing. The shape of the keypad façade and its flush configuration with the housing makes the mobile computing device more sleek and atheistically pleasing in appearance.

As examples, the mobile computing device 100 may correspond to any device that includes roaming wireless network and/or telephony capabilities, including cellular telephony devices and/or mobile messengers. In particular, embodiments described herein may apply to numerous kinds of mobile or small form-factor computing devices. One type of mobile computing device that may be configured to include embodiments described herein includes a computer telephony device, such as a cellular phone or mobile device with voice-telephony applications (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Mobile computing devices in particular may have numerous types of input mechanisms and user-interface features, such as keyboards or keypads, multi-directional or navigation buttons, application or action buttons, and contact or touch-sensitive display screens. Some devices may include combinations of keyboard, button panel area, and display screen on one façade. The button panel region may occupy a band between the keypad and the display area, and include a navigation button and multiple application buttons or action buttons.

Specific types of messaging that may be performed include messaging for email applications, Short Message Service (SMS) messages, Multimedia Message Service (MMS) messages, and proprietary voice exchange applications (such as SKYPE). Still further, other types of computing devices contemplated with embodiments described herein include laptop or notebook computers, ultra-mobile computers, personal digital assistants, and other multi-functional computing devices or mobile/portable devices.

Still further, one or more embodiments may be implemented through any type of computing device such as a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System (PSTN)) and provide software interfaces and applications.

The mobile computing device 100 includes a housing 110 that includes a section 120. The section 120 of the housing 110 is configured to retain a keypad assembly 130. In some embodiments, the housing 110 may also include a variety of electrical components such as a display, buttons, audio components, network and radio resource, memory, battery source, and other components. The housing 110 of the mobile computing device 100 may have any one of many possibly housing types or constructions. As described herewith, for example, an embodiment of FIGS. 3A and 3B, the housing 110 may be of a slider-type housing construction.

The keypad assembly 130 includes a keypad façade 132 that carries a plurality of keys 134. In particular, the keys 134 may be assembled or formed on the keypad façade 132 so as to be integral or unitarily formed with the keypad façade 132. For example, the keys 134 may be molded on or adhered to the keypad façade 132. The keypad façade 132 may be contoured to facilitate transition of the keypad façade 132 to the surrounding housing. In some embodiments, the keypad façade 132 is shaped at its periphery regions to be contoured so that the keypad façade 132 can adjoin and be substantially flush with the section 120 of the housing 110. The contour of the periphery regions includes raised thicknesses, or a peripheral lip which at least partially circumvent the keypad façade 132. Still further, in some embodiments, the peripheral lip of the keypad assembly 130 is dimensioned and shaped to be substantially flush with the housing 110.

In one or more embodiments, the section 120 includes a cavity or opening that borders the keypad façade 132 so that the edges or boundary of the keypad façade 132 is fitted to the cavity or opening of the section 120. In some embodiments, the keypad façade 132 is contoured so that it includes a lip 140 that is at least partially provided along the perimeter of the keypad façade 132. The lip 140 may be positioned near the edges or the boundary of the keypad façade 132 and may also include a surface that is oriented towards the plurality of keys. Because the lip 140 is a part of the keypad façade 132, the entire shape of the keypad façade 132 can be manufactured as a whole (e.g., as one solid piece). This can be beneficial for manufacturing the mobile computing device 100.

In an embodiment, the keypad assembly 130 is an integrated, modular assembly that is assembled separately from the overall device. As a modular unit, the keypad assembly 130 includes both a plurality of keys 134 and electronics for detecting key press events. Interconnect elements, sensors, circuitry, and/or other components may be combined into the keypad assembly 130. A flex cable or other connective mechanisms may be used to electrically connect the keypad assembly 130 to the electronics of the mobile computing device 100.

The keypad façade 132 is designed to be contoured so that the edges or boundary can be substantially flush with the section 120 of the housing 110. This enables the mobile computing device 100 to be manufactured more easily as the keypad assembly 130 does not require a part or portion of the housing 110 to cover or overlap it. The lip 140 may enable the keypad façade 132 to be relatively sunken with respect to the housing 110 so that the keys 134 feel more at level with the housing 110. As discussed, the lip 140 may be positioned near the edges or the boundary of the keypad façade 132. Because the plurality of keys 134 protrudes outward away from the surface of the keypad façade 132, the surface of the keypad façade 132 near the plurality of keys 134 is more recessed than the edges or boundary of the keypad façade 132.

According to an embodiment, the lip 140 of the keypad façade 132 is provided within or along the edges or boundary of the keypad façade 132, so as to adopt the overall shape of the keypad façade 132. In one embodiment, the lip 140 is provided along the entire perimeter of the keypad façade 132. Alternatively, the lip 140 can border at least a portion of the perimeter of the keypad façade 132 depending on the shape and/or opening of the section 120 of the housing 110. Examples of the lip 140 and keypad façade 132 are further discussed with reference to FIGS. 1B and 1C below.

The plurality of keys 134 that are provided with the keypad façade 132 can have a variety of different shapes and sizes, depending on one or more embodiments. The plurality of keys 134 may be circular or elliptical in shape, or rectangular in shape. The rectangular keys may have curved corners, in some embodiments, and may also be skewed in one direction (e.g., so that the keys are shaped more like parallelograms) to more closely match the shape of the keypad façade 132. The plurality of keys 134 may also have different sizes and lengths depending on the key functionality and/or purpose. For example, a key 134 that corresponds to a space bar can be longer and larger than another key that corresponds to a letter. The keys 134 may also include contours that promote specific contact points that are spaced from other keys 134. Alternatively, the keys 134 may be flat or flat with concaved contours.

The keypad assembly 130 may include a plurality of keys 134 that enable text and/or numeric entry. In FIG. 1A, for example, the keypad assembly 130 is configured to provide a plurality of keys 134 having a full keyboard layout. The keyboard layout can be a QWERTY configuration. The plurality of keys 134 can also correspond to a number or dial pad by having some keys correspond to both alphabetic characters and numbers. For example, keys may be selected to carry numbers "1-9" in three rows and three columns, with "0" being formed as an isolated element in a different row. The same keys can also provide alphabetic characters.

In an embodiment, the keypad assembly 130 may be a modular unit, so as to be provided substantially as one component in an assembly process where the device is assembled. For example, the keypad assembly 130 may be provided as a modular multi-layer component, having a keypad façade laminated over an illumination later and electrical contact layer. The layers may be packaged as one assembly product and incorporated into the housing 110. In some embodiments, the layers may also be fixed together using adhesive means in between the layers.

Cross-Sectional Descriptions

Figure 1B:
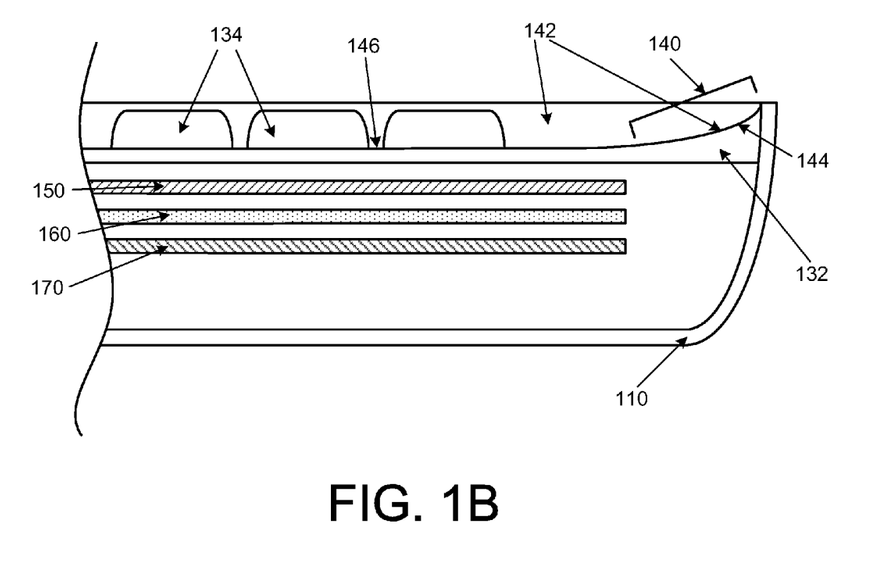
FIGS. 1B and 1C are cross-sectional views of a keypad assembly, as seen along lines A-A and B-B of FIG. 1, respectively, under an embodiment.
Figure 1C:
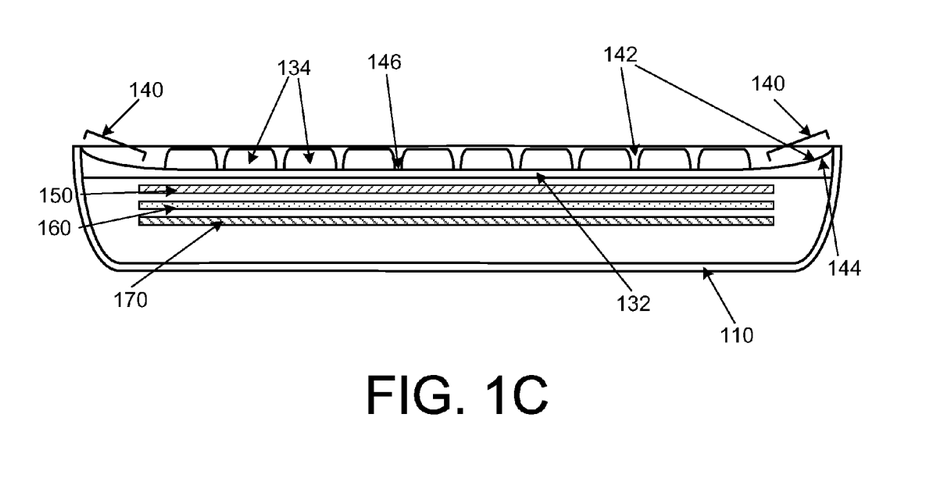

FIGS. 1B and 1C are cross-sectional views of a keypad assembly, as seen along lines A-A and B-B of FIG. 1A, respectively, under an embodiment. FIG. 1B is a side cross-sectional view of a keypad assembly, as seen along lines A-A of FIG. 1A, under an embodiment. The housing 110 of the mobile computing device 100 provides a section 120 that is configured to retain the keypad assembly 130. The keypad assembly 130 includes a keypad façade 132 that carries a plurality of keys 134. As illustrated in the cross-section view of the keypad assembly in FIG. 1B, the keypad façade 132 is contoured (or has a curve 144) that enables the keypad façade 132 to adjoin and be substantially flush with the housing 110. The keypad façade 132 has a thickness that varies from a flat portion or area 146 to a curved portion. The keypad façade 132 may also have a curved portion that is more curved or less curved, depending on various embodiments. By having a contour, the keypad façade 132 may be assembled as part of the keypad assembly 130 to fit snug with the housing 110 of the mobile computing device.

The keypad façade 132 is contoured so that the surface curves from the flat portion or area 146 to the lip 140. In some embodiments, the lip 140 at least partially circumvents the plurality of keys 134, and is provided along the perimeter of the keypad façade 132. The lip 140 includes a surface 142 that is oriented toward the plurality of keys 134. Because the lip 140 may be provided along the entire perimeter of the keypad façade 132, the surface 142 of the lip 140 can be seen on two different edges or sides of the keypad façade 132. In this manner, the keypad façade 132 may adjoin and be substantially flush with the housing 110 at various points all around the perimeter of the keypad façade 132.

For example, FIG. 1C is a side cross-sectional view of a keypad assembly, as seen along lines B-B of FIG. 1A, under an embodiment. This cross-sectional view shows the housing 110 from one side of the mobile computing device to the other side. Because the lip 140 may be provided along the entire perimeter of the keypad façade 132, the surface 142 of the lip 140 of the keypad façade 132 can be seen on three different sides or edges of the keypad façade.

In one or more embodiments, the keypad assembly 130 of the mobile computing device 100 also includes a plurality of different layers, such as an adhesive layer 150, an illumination layer 160 and an electrical contact layer 170. In some embodiments, there can be more than one adhesive layer 150 to provide a means to join and/or secure numerous keypad assembly 130 layers together. The illumination layer 160 may be included in the keypad assembly 130 to provide light to a plurality of characters that are provided on the plurality of keys. For example, when the mobile computing device 100 is being used by a user, the illumination layer 160 can assist and enable a user to see the alphanumeric characters on the plurality of keys. The illumination layer 160 may be provided by an array of light emitting diodes (LEDs), an electroluminescence pad or sheet, or other lighting methods.

The keypad assembly 130 also includes the electrical contact layer 170. The electrical contact layer 170 can have contacts that correspond to each of the plurality of keys 134. In some embodiments, the electrical contact layer 170 may comprise a printed circuit board (PCB) such as a FR-4 PCB or a flex PCB. The electrical contact layer 170 of the keypad assembly 130 may be coupled to one or more electrical components of the mobile computing device 100 to enable a user to access resources of the mobile computing device 100 and provide input using the keypad assembly 130. In some embodiments, the electrical contact layer 170 may include electronics for detecting key press events. The electrical contact layer 170 may include interconnect components or elements, sensors, and/or other circuitry to connect the keypad assembly 130 with the electronics of the mobile computing device 100 (e.g., such as a processing resource). In other embodiments, a flex cable or other connective mechanisms may be used to electrically connect the keypad assembly 130 to the electronics of the mobile computing device 100.

The plurality of keys 134 may be depressed downward (or pushed inward towards the electrical contact layer) by a user to actuate an input. When a user pushes or compresses a key 134 downwards (e.g., toward the layers), the keypad façade 132 partially flexes in order to actuate an input. In other embodiments, the layers of the keypad assembly 130 can be arranged in different order than illustrated in FIGS. 1B and 1C.

In some embodiments, the keypad façade 132 may be manufactured as one solid component. The keypad façade 132 is contoured to adjoin and be substantially flush with the housing 110, as discussed above. Because the keypad façade 132 with the lip 140 may be manufactured as one solid component, no extra boundary or cover of the housing 110 is needed to keep the keypad façade 132 in place. This can provide manufacturing benefits such as decreasing costs for manufacturing the mobile computing device 100 because fewer parts are needed. Furthermore, because no extra boundary or cover of the housing 110 is needed to keep the keypad façade 132 in place (i.e., because the keypad façade 132 is fits snug with the housing 110), misalignment issues in manufacturing the computing device 100 is decreased (e.g., the process does not require the aligning the keypad assembly with the housing 110 and the extra boundary or cover).

The keypad façade 132 may be comprised of different materials. The keypad façade 132, in one embodiment, for example, can be made of polyethylene terephthalate (PET) or other types of material. In some embodiments, the plurality of keys 134 may also be made of the same material. In other embodiments, however, the plurality of keys 134 may be comprised of different material, such as polyurethane (PU) or silicon, or other types of material.

Keypad Configurations

Figure 2A:
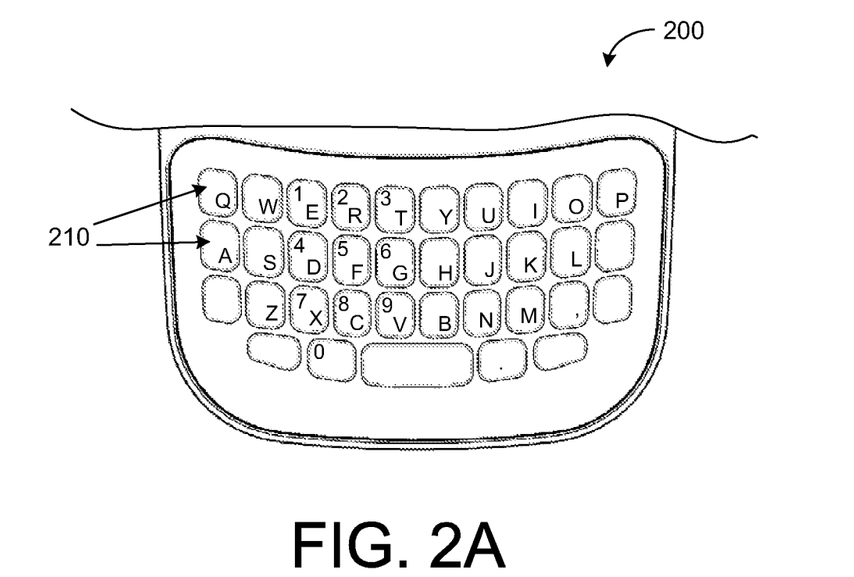
FIGS. 2A and 2B illustrate different keypad configurations that may be implemented with the keypad assembly, under an embodiment.
Figure 2B:
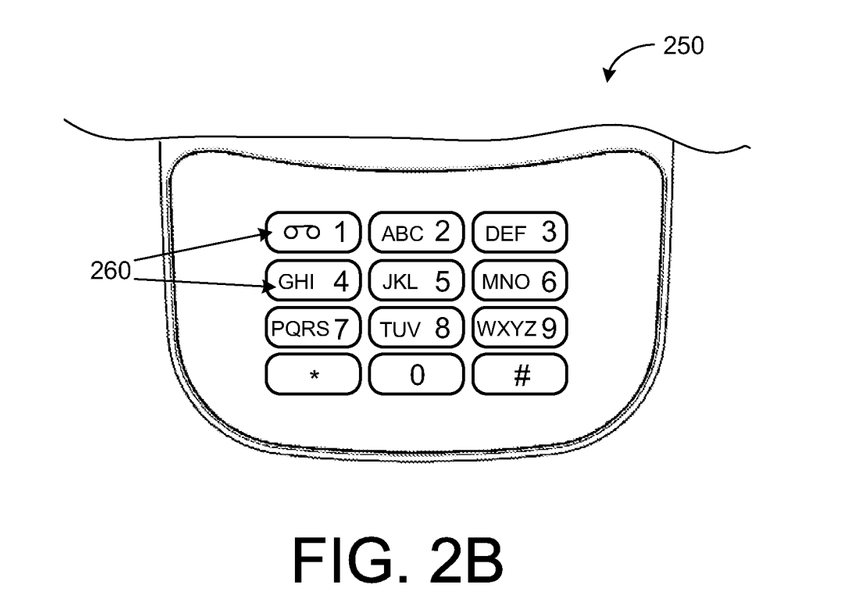

As discussed in FIG. 1A, the keypad assembly 130 of the mobile computing device 100 may include a plurality of keys 134 that enable text and numeric entry. FIG. 2A and FIG. 2B illustrate different keypad configurations that may be implemented with keypad assembly 200, under one or more embodiments. In one implementation shown by FIG. 2A, the keypad assembly 200 has a QWERTY configuration. The plurality of keys 210 provides alphabetic characters configured to represent a typical QWERTY keyboard. Optionally, some of individual keys 210 that collectively comprise the QWERTY configuration may be assigned numerical values that form a number or dial pad. As such, the keypad assembly 200 may be provided with, for example, thirty or more keys, including special character keys (e.g., period, comma, number sign, question mark, etc.), space bar, and/or application keys. A designated cluster of the keys may be provided numeric alternative values.

In other embodiments, the keypad assembly 250 may be implemented in a numeric-centric configuration. For example, keys may be selected to carry numbers "1-9" in three rows and three columns, with "0" being formed as an isolated element in the bottom row. In an implementation shown by FIG. 2B, the plurality of keys 260 are primarily part of a dial pad (e.g., ten keys), but also have an alternative entry mode for text (e.g., predictive text entry). Numerous alternatives or additions are possible, such as, for example, toggle keyboards.

Slider Housing Constructions

Figure 3A:
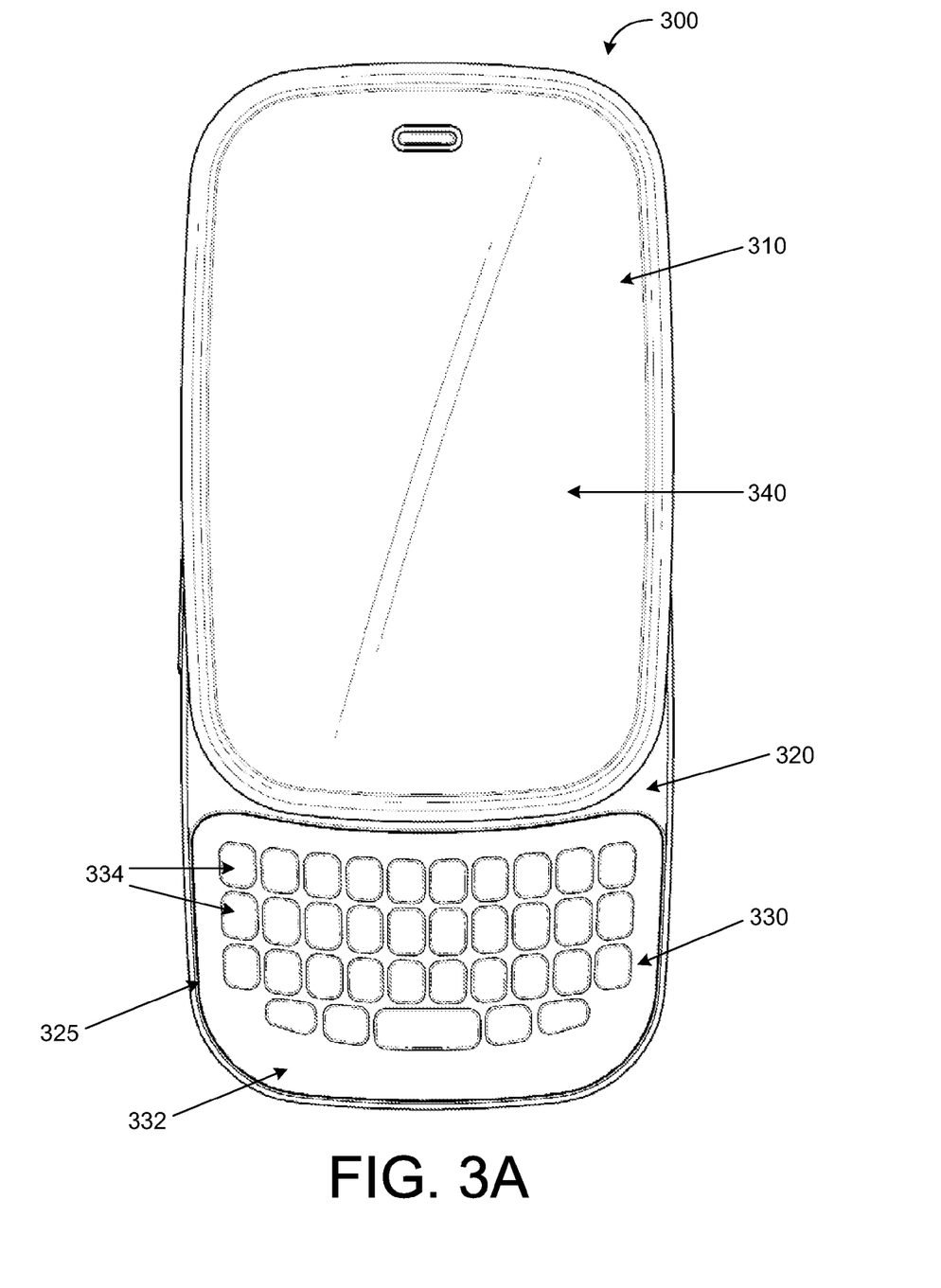
FIGS. 3A and 3B illustrate embodiments in which a mobile computing device has a slider-housing type construction.
Figure 3B:
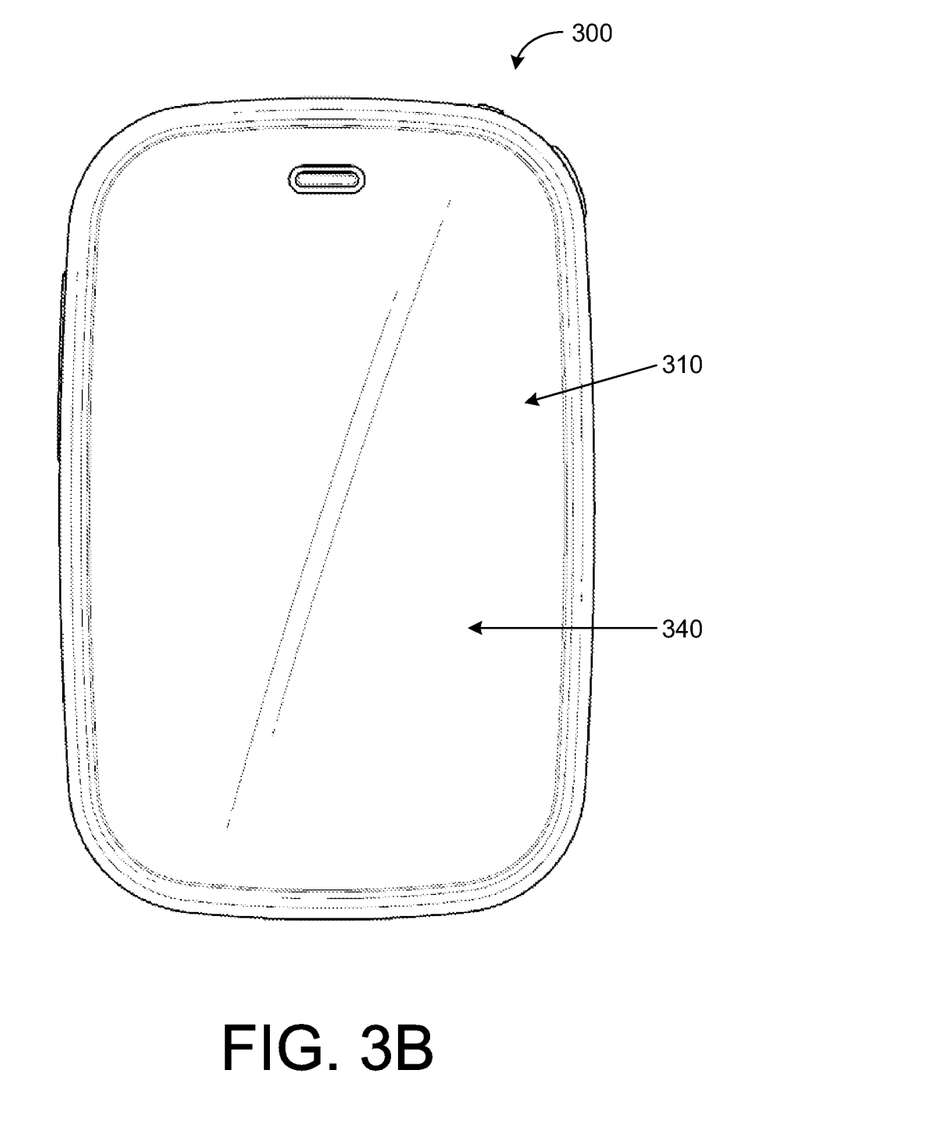

FIGS. 3A and 3B illustrate embodiments in which a mobile computing device has a slider-housing type construction. FIGS. 3A and 3B illustrate an embodiment in which the mobile computing device 300 comprises two housing segments 310, 320 that are moveably coupled to one another. The first housing segment 310 and the second housing segment 320 are slideably coupled to move between an extended position (FIG. 3A) and a contracted positioned (FIG. 3B). The first housing segment 310 may thus, for example, move over the second housing segment 320 when the two housing segments are moved from an extended position to a contracted position. As seen in FIG. 3B, when the mobile computing device 300 is in a fully contracted position, the two housing segments overlay each other.

When the mobile computing device 300 is in an extended position (FIG. 3A), the keypad assembly 330 is exposed with the second housing segment 320. The second housing segment 320 can have a section 325 that is configured to retain the keypad assembly 330. The keypad assembly 330 has a keypad façade 332 that carries a plurality of keys 334. The keypad façade 332 is shaped to be contoured so that the keypad façade 332 can adjoin and be substantially flush with the section 325 of the second housing segment 320. In one or more embodiments, the section 325 includes a cavity or opening that borders the keypad façade 332 so that the edges or boundary of the keypad façade 332 fits snug with the cavity or opening of the section 325. In some embodiments, the keypad façade 132 is contoured so that it includes a lip that at least partially circumvents the plurality of keys. The lip may include a surface that is oriented towards the plurality of keys.

The keypad façade 332 is designed to be contoured so that the edges or boundary can be flush with the section 325 of the second housing segment 320. This enables the mobile computing device 300 to be manufactured more easily as the keypad assembly 330 does not require a part or portion of the second housing segment 320 to cover or overlap it. The lip may also enable the keypad façade 332 to be relatively sunken with respect to the second housing segment 320 so that the keys 334 feel more level with the rest of the second housing segment 320. As discussed, the lip may be positioned near the edges or the boundary of the keypad façade 332. Because the plurality of keys 334 protrudes outward away from the surface of the keypad façade 332, the surface of the keypad façade 332 near the plurality of keys 334 is more recessed than the edges or boundary of the keypad façade 332.

In some implementations, the first housing segment 310 includes a display surface 340 and other user-interface features (e.g. buttons, sensors, touch-screen or area, microphone, speaker). The mobile computing device 300 may be operational in one or more modes when in either the contracted position or the extended position. For example, the mobile computing device 300 may be operated as a telephony device, picture viewer, web browser etc. In other implementations, the contracted position (FIG. 3B) may be used to provide virtual keyboards or soft buttons on the display surface 340 to facilitate user operation.

According to an embodiment, the plurality of keys 334 of the keypad assembly 330 extend outward from the keypad façade 332. The keys 334 are completely contained in height by the lip of the keypad façade 332. As such, a gap distance to accommodate the key height between the first and second housing segments 310, 320 is not required. Rather, the lip extends near the edges of the keypad façade 332 (because the keypad façade is contoured) and enables the two housing segments 310, 320 to be tightly spaced apart in the contracted position (see FIG. 3B) without need to accommodate key structure heights.

As discussed, the keypad assembly 330 may include various layers, such as an illumination layer and/or an electrical contact layer. In some embodiments, the electrical contact layer may comprise a printed circuit board (PCB) such as a FR-4 PCB or a flex PCB. The electrical contact layer of the keypad assembly 330 may be coupled to one or more electrical components of the mobile computing device 300 to enable a user to access resources of the mobile computing device 300 and provide input using the keypad assembly 330. In some embodiments, the electrical contact layer may include electronics for detecting key press events. The electrical contact layer may include interconnect components or elements, sensors, and/or other circuitry to connect the keypad assembly 330 with the electronics of the mobile computing device 300 (e.g., such as a processing resource). The mobile computing device 300 may also include a flex cable or other connective mechanisms may be used to electrically connect the keypad assembly 330 to the electronics of the mobile computing device 300. Because the mobile computing device 300 has two housing segments 310, 320, a flex cable interconnect the electrical components of the mobile computing device 300 despite the mobile computing device 300 being in an extended or contracted position.

Hardware Diagram

Figure 4:
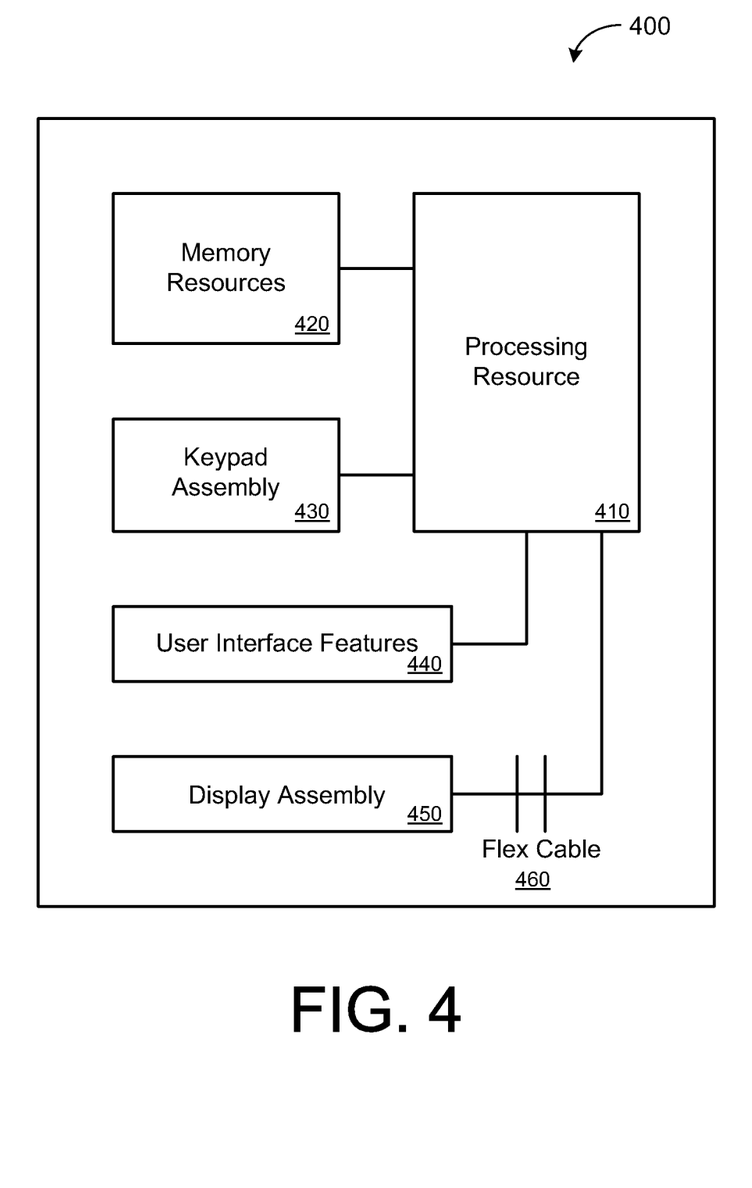
FIG. 4 illustrates a hardware diagram for a mobile computing device for use with any of the embodiments described herein.

FIG. 4 illustrates a hardware diagram for a mobile computing device for use with any of the embodiments described herein. Numerous components and functionality may be incorporated for use with the device 400. The components include, for example, processors, memory components, interconnect elements, a printed circuit board, internal elements of a keypad of keyboard, a liquid crystal display (LCD) of a display assembly, speakers or other audio equipment, wireless transmitters for different types of wireless communication mediums (e.g. Wireless Fidelity or Wi-Fi, Bluetooth, Wi-Max cellular) and numerous other components.

According to an embodiment, the device 400 may correspond to any of the devices illustrated with preceding embodiments. The device 400 may include one or more processors 410, memory resources 420, a keypad assembly 430, various user-interface features 440, and a display assembly 450. In one embodiment, at least some of the components may be provided in a different housing segment from the one or more processors 410. The display assembly 450, for example, may be provided with a first housing segment, while the one or more processors 410 is provided with a second housing segment. A flex cable 460 may be used to interconnect the separated display assembly 450 and/or user-interface features 440 from the one or more processors 410 and/or other components. However, in other embodiments, any of the internal components and devices, including one of multiple processors, may be distributed between the two housing segments.

In some embodiments, the display assembly 450 can comprise a touch screen display. The touch screen display can receive user input through contact on the display and communicate the information to the one or more processing resources 410. In other embodiments, the one or more processors 410 are capable of generating or detecting input from soft-interface features that are provided with the display assembly 450. The soft-user interface features may be provided as computer-generated features in connection with operation of the display assembly 450, or alternatively, as fixed features. One or more embodiments provide that the soft-user interface features may operate with touch, contact or light sensors (e.g. capacitive sensors).

Alternative Embodiments

While embodiments provided herein describe a mobile computing device that has a single-body housing construction, or a mobile computing device that has two segments that are slideably coupled, other variations of devices that include the keypad assembly are possible. For example, the housing of the mobile computing device can have a "flip" construction, in which a first housing segment pivots relative to a second housing segment, so as to move between an open and closed position.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A mobile computing device comprising:
   a housing including a cavity on a front surface of the housing to retain a flexible keypad assembly;
   wherein the flexible keypad assembly includes a keypad façade formed of a flexible material on which a plurality of keys are integrally formed, the keypad façade configured to flex when each key in the plurality of keys is pressed;
   wherein the keypad façade includes a lip that curves inwardly towards the plurality of keys, the lip fully circumscribing the plurality of keys and being contoured to adjoin and be flush with a perimeter of the cavity on the front surface of the housing; and
   wherein the keypad assembly further includes a flexible electrical contact layer coupled to a bottom surface of the keypad façade, the electrical contact layer configured to receive key inputs from the plurality of keys and correspondingly connect the key inputs to processing resources of the mobile computing device.

2. The mobile computing device of claim 1, wherein the keypad assembly includes an adhesive layer positioned underneath the keypad façade.

3. The mobile computing device of claim 1, wherein the keypad assembly includes an illumination layer to provide light to a plurality of characters on the plurality of keys.

4. The mobile computing device of claim 1, wherein the flexible electrical contact layer is a printed circuit board for providing connections to the processing resources of the mobile computing device.

5. The mobile computing device of claim 1, wherein the plurality of keys provide a QWERTY type keyboard.

6. The mobile computing device of claim 5, wherein the plurality of keys also provides a number pad.

7. A mobile computing device comprising:
   a first housing segment and a second housing segment, wherein the first housing segment is slideably coupled to the second housing segment;
   wherein the second housing segment includes a cavity on a front surface of the second housing segment to retain a flexible keypad assembly;
   wherein the keypad assembly includes a keypad façade formed of a flexible material on which a plurality of keys are integrally formed, the keypad façade configured to flex when each key in the plurality of keys is pressed;
   wherein the keypad façade includes a lip that curves inwardly towards the plurality of keys, the lip fully circumscribing the plurality of keys and being contoured to adjoin and be flush with a perimeter of the cavity on the front surface of the second housing segment; and
   wherein the keypad assembly further includes a flexible electrical contact layer coupled to a bottom surface of the keypad façade, the electrical contact layer configured to receive key inputs from the plurality of keys and correspondingly connect the key inputs to processing resources of the mobile computing device.

8. The mobile computing device of claim 7, wherein the keypad assembly includes an adhesive layer positioned underneath the keypad façade.

9. The mobile computing device of claim 7, wherein the keypad assembly includes an illumination layer to provide light to a plurality of characters on the plurality of keys.

10. The mobile computing device of claim 7, wherein the electrical contact layer is a printed circuit board for providing connections to the processing resources of the mobile computing device.

11. The mobile computing device of claim 7, wherein the plurality of keys provides a QWERTY type keyboard.

12. The mobile computing device of claim 11, wherein the plurality of keys also provides a number pad.

13. The mobile computing device of claim 7, wherein the first housing segment and the second housing segment are slideably coupled to move between an extended position and a contracted position, so that the keypad assembly is not visible when the first housing segment and the second housing segment are in the contracted position.

14. The mobile computing device of claim 8, further comprising a display assembly provided with the first housing segment.

15. The mobile computing device of claim 8, further comprising one or more flex cables for interconnecting electrical components of the first housing segment and electrical components of the second housing segment.

16. A flexible keypad assembly for a mobile computing device, the mobile computing device including a housing with a front surface, the housing including a cavity on the front surface to retain the flexible keypad assembly, the flexible keypad assembly comprising:

a keypad façade formed of a flexible material on which a plurality of keys are integrally formed, the keypad façade configured to flex when each key in the plurality of keys is pressed;

wherein the keypad façade includes a lip that curves inwardly towards the plurality of keys, the lip fully circumscribing the plurality of keys and being contoured to adjoin and be flush with a perimeter of the cavity on the front surface of the housing; and     wherein the keypad assembly further includes a flexible electrical contact layer coupled to a bottom surface of the keypad façade, the electrical contact layer configured to receive key inputs from the plurality of keys and correspondingly connect the key inputs to processing resources of the mobile computing device.

17. The flexible keypad assembly of claim 16, wherein the flexible keypad assembly is modular.

18. The flexible keypad assembly of claim 16, wherein the flexible electrical contact layer includes electrical interconnect elements to operatively connect the flexible keypad assembly to the processing resources of the mobile computing device.

\* \* \* \* \*